United States Patent
Kang

(10) Patent No.: US 12,257,947 B2
(45) Date of Patent: Mar. 25, 2025

(54) LAMP

(71) Applicant: HYUNDAI MOBIS CO., LTD., Seoul (KR)

(72) Inventor: Dong Hwa Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/660,313

(22) Filed: May 10, 2024

(65) Prior Publication Data

US 2024/0375578 A1    Nov. 14, 2024

(30) Foreign Application Priority Data

May 11, 2023   (KR) .................. 10-2023-0061188

(51) Int. Cl.
*B60Q 1/30*   (2006.01)
*B60Q 1/50*   (2006.01)

(52) U.S. Cl.
CPC ............. *B60Q 1/301* (2022.05); *B60Q 1/543* (2022.05); *B60Q 2400/50* (2013.01)

(58) Field of Classification Search
CPC ........ B60Q 1/2696–3015; B60Q 1/543; B60Q 2400/50
See application file for complete search history.

(56) References Cited

U.S. PATENT DOCUMENTS 11,512,830 B2 * 11/2022 Nicholson ............... F21S 41/36
2022/0221123 A1 * 7/2022 Okubo ..................... F21S 43/14

* cited by examiner

*Primary Examiner* — Jason M Han
(74) *Attorney, Agent, or Firm* — Novo TechIP International PLLC

(57) ABSTRACT

Disclosed is a lamp includes a light source that outputs light, and a mask that forms a beam pattern on a road surface as the light output from the light source reaches the mask, any portion of the reaching light is input thereto and then is output therefrom, and the mask includes a long distance area that forms a long distance pattern in the beam pattern on the road surface as long distance light in the light output from the light source reaches the long distance area, and at least a portion of the reaching long distance light is input thereto and then is output therefrom, and a short distance area that forms a short distance pattern in the beam pattern, which is located at a distance that is closer to the mask than the long distance pattern, on the road surface as short distance light in the light output from the light source reaches the short distance area, and any portion of the reaching short distance light is input thereto and then is output therefrom.

16 Claims, 6 Drawing Sheets

LAMP

CROSS-REFERENCE TO RELATED APPLICATIONS

This application claims the benefit of priority to Korean Patent Application No. 10-2023-0061188, filed in the Korean Intellectual Property Office on May 11, 2023, the entire contents of which are incorporated herein by reference.

TECHNICAL FIELD

The present disclosure relates to a lamp.

BACKGROUND

Lamps provided in a vehicle may include rear guide lamps, and turn signal guide lamps. Among them, the rear guide lamps are turned on and off together with rear lamps, and may project light to a road surface located on a rear side of the road surface. In detail, the rear guide lamps may project light to a road surface that is adjacent to a rear side of the vehicle to form a beam pattern on the road surface. The light projected to the road surface may prevent an accident by delivering an intention for a rearward movement to drivers of the surrounding vehicles and pedestrians around the vehicle.

A beam pattern that is implemented by the light projected to the road surface by a conventional guide lamp has an image, an illumination intensity of which becomes lower as it goes more distant from the guide lamp. That is, an illumination intensity of a short distance pattern that is a beam pattern formed at a relatively short distance from the guide lamp and an illumination intensity of a long distance pattern that is a beam pattern formed a relatively long distance from the guide lamp are different. In this way, because the illumination intensities of the short distance pattern and the long distance pattern are different, a uniformity of the entire beam pattern according to a relative distance from the guide lamp is degraded. As the uniformity of the entire beam pattern is degraded, a visual recognition for the beam pattern by drivers of surrounding vehicles and pedestrians is degraded.

Accordingly, in recent years, needs for guide lamps that may enhance a uniformity of the entire beam pattern by minimizing a difference between illumination intensities of a short distance pattern and a long distance pattern have been continuously increasing.

SUMMARY

The present disclosure has been made to solve the above-mentioned problems occurring in the prior art while advantages achieved by the prior art are maintained intact.

An aspect of the present disclosure provides a lamp that may enhance a uniformity of an entire beam pattern by minimizing a difference between illumination intensities of a short distance pattern and a long distance pattern.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp includes a light source that outputs light, and a mask that forms a beam pattern on a road surface as the light output from the light source reaches the mask, any portion of the reaching light is input thereto and then is output therefrom, and the mask includes a long distance area that forms a long distance pattern in the beam pattern on the road surface as long distance light in the light output from the light source reaches the long distance area, and at least a portion of the reaching long distance light is input thereto and then is output therefrom, and a short distance area that forms a short distance pattern in the beam pattern, which is located at a distance that is closer to the mask than the long distance patter, on the road surface as short distance light in the light output from the light source reaches the short distance area, and any portion of the reaching short distance light is input thereto and then is output therefrom.

Furthermore, the short distance area may include a pattern shield area that shields the short distance light, and wherein the pattern shield area may include a plurality of shield dots.

Furthermore, the lamp may further include an opening that forms an effective aperture that is a maximum aperture, through which the light output from the lamp passes, and when a length, by which the beam pattern extends along a direction, in which the short distance pattern and the long distance pattern are arranged, is defined as a beam pattern length, a radius of the shield dot may be calculated by Equation 1 below, $$r = (RP \times 0.5D)/BL \qquad \text{[Equation 1]}$$

(D: the effective aperture, BL: the beam pattern length, RP: a resolving power, and r: the radius of the shield dot).

Furthermore, when an imaginary straight line extending in a direction, in which the light source faces a center of the opening, is defined as an optical axis and an angle between the optical axis and an imaginary straight line extending in a direction that is perpendicular to the road surface is defined as an irradiation angle, and a spacing distance in a direction of the optical axis, between a point, at which a chief ray that is an imaginary straight line extending from the center of the opening in a direction that is askew from the optical axis and the road surface cross each other, and the opening, is defined as an irradiation distance and an angle between the chief ray and the optical axis is defined as an image forming angle, the beam pattern length may be calculated by Equation 2 below, $$BL = (ad \times \tan(Ia))/\cos(a) \qquad \text{[Equation 2]}$$

(BL: the beam pattern length, a: the irradiation angle, ad: the irradiation distance, and Ia: the image forming angle).

Furthermore, the plurality of shield dots may be spaced apart from each other.

Furthermore, the plurality of shield dots may be spaced apart from each other in circumferential directions of a plurality of imaginary circles, centers of which are an optical axis extending in a direction, in which the light source faces the mask.

Furthermore, the plurality of imaginary circles may include a first imaginary circle, and a second imaginary circle, a radius of which is smaller than that of the first imaginary circle and being concentric to the first imaginary circle, and radii of the plurality of shield dots spaced apart from each other along the first imaginary circle may be greater than radii of the plurality of shield dots spaced apart from each other along the second imaginary circle.

Furthermore, the plurality of shield dots may include shield dot groups spaced apart from each other along a horizontal direction, the shield dot groups may include a first shield dot group, and a second shield dot group spaced apart from the first shield dot group in a vertical direction to be located to be closer to an optical axis extending in a direction, in which the light is output from the light source, than the first shield dot group, and radii of the plurality of shield dots included in the first shield dot group may be greater than radii of the plurality of shield dots included in the second shield dot group.

Furthermore, the short distance area may further include a transmission area, from which the short distance light is output after being input thereto and passing therethrough, and the transmission area may define an area between, among the plurality of shield dots, two adjacent shield dots.

Furthermore, when a direction facing the long distance area from the short distance area is defined as a first direction, the short distance area may have a shape, a horizontal width becomes smaller as it goes in the first direction.

Furthermore, the long distance area may be disposed in the first direction of the short distance area to be spaced apart from the short distance area.

Furthermore, when an opposite direction to the first direction is defined as a second direction, a horizontal width of the short distance area in the first direction may be greater than a horizontal width of the long distance area in the second direction.

Furthermore, the long distance area may have a shape, of which a horizontal width becomes smaller as it goes in the first direction.

Furthermore, the long distance area may include a first long distance area, and a second long distance area disposed in the first direction of the first long distance area to be spaced apart from the first long distance area, and a horizontal width of the first long distance area in the first direction may be greater than a horizontal width of the second long distance area in the second direction.

Furthermore, the mask may further include a peripheral area that shields another portion of the light that reaches the mask, and the peripheral area may surround peripheries of the short distance area and the long distance area.

Furthermore, the mask may include a glass that transmits the light output from the light source, and a shield part that shields the light output from the light source, and the shield part may be coated on at least a portion of a surface of the glass, which faces the light source.

Furthermore, the shield part may include a chrome (Cr) material.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
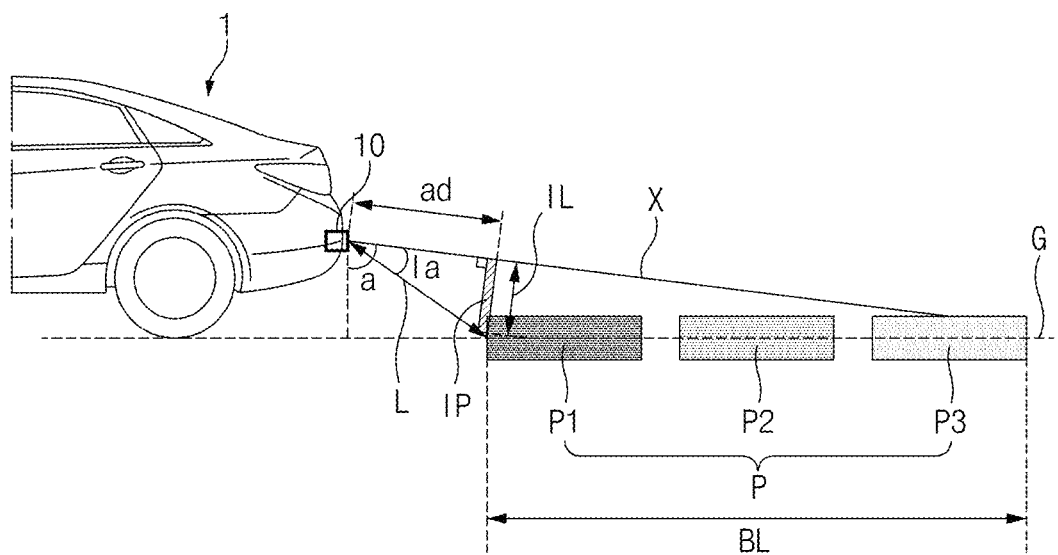
FIG. 1 is a side view of a vehicle according to an embodiment of the present disclosure.

Hereinafter, embodiments of the present disclosure will be described in detail with reference to the accompanying drawings. In adding reference numerals to the components of the drawings, it is noted that the same components are denoted by the same reference numerals even when they are drawn in different drawings. Furthermore, in describing the embodiments of the present disclosure, when it is determined that a detailed description of related known configurations and functions may hinder understanding of the embodiments of the present disclosure, a detailed description thereof will be omitted.

Furthermore, in describing the components of the embodiments of the present disclosure, terms, such as first, second, "A", "B", (a), and (b) may be used. The terms are simply for distinguishing the components, and the essence, the sequence, and the order of the corresponding components are not limited by the terms. It should be understood that, when it is described a component "reaches", "is input to", "is output from", or "passes through" another component, the former component may be directly input to, passes through, or is output from the latter component, but a third component may "reach", "be input to", "be output from", or "pass through" between the two components.

Hereinafter, a vehicle 1 according to an embodiment of the present disclosure will be described with reference to the drawings.

Figure 2:
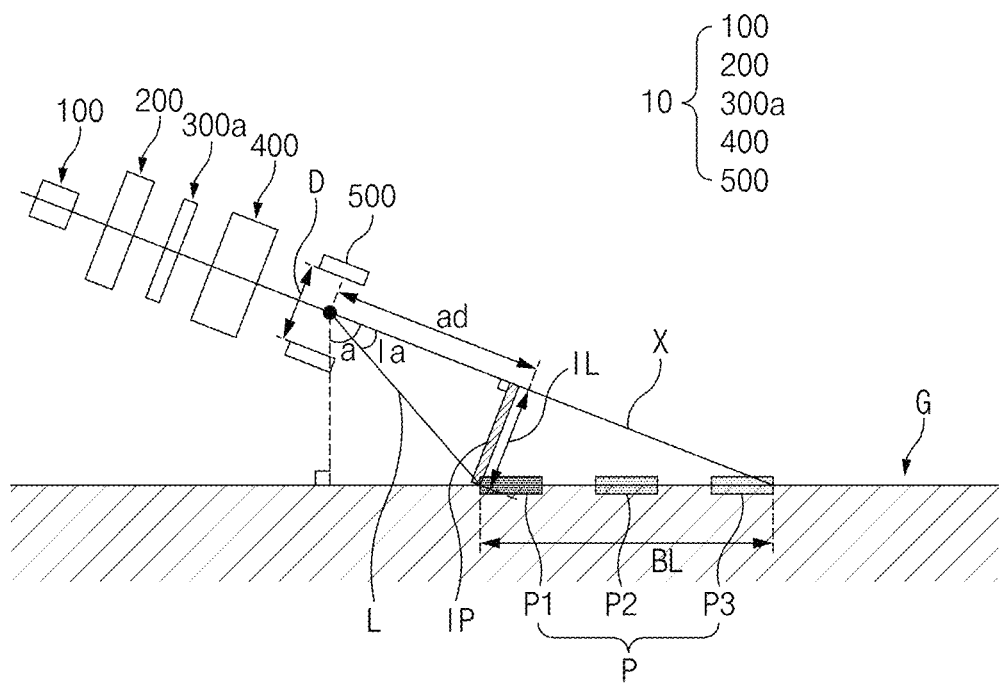
FIG. 2 is a conceptual view conceptually illustrating a lamp according to an embodiment of the present disclosure.
Figure 3:
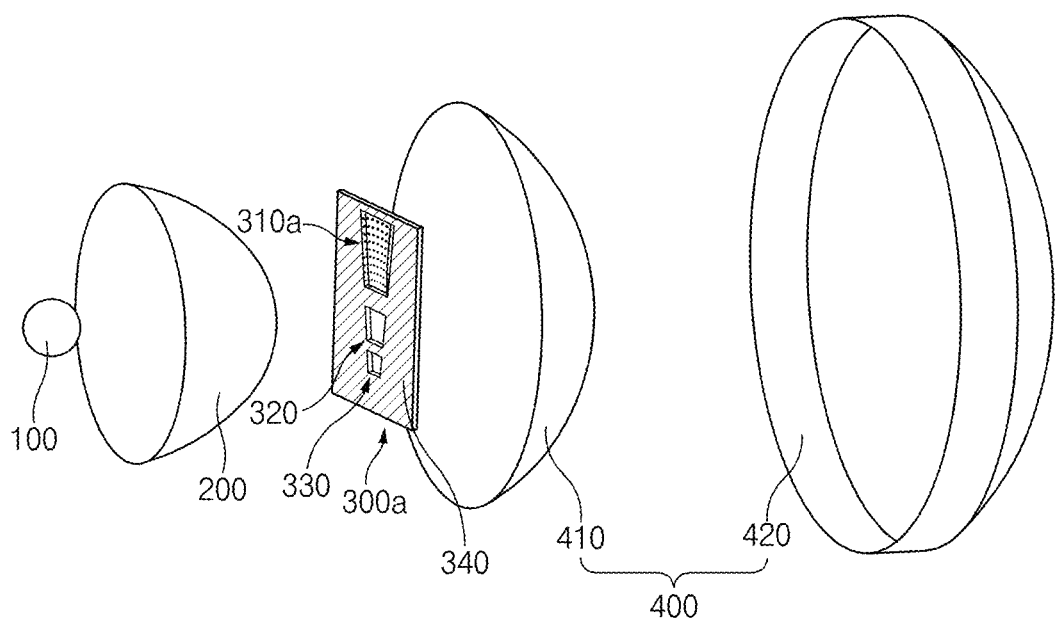
FIG. 3 is an exploded perspective view of a lamp according to an embodiment of the present disclosure.

Referring to FIGS. 1 to 3, the vehicle 1 may include a lamp 10 and a frame. The lamp 10 may form a beam pattern "P" on a road surface "G". For example, the lamp 10 may output light toward the road surface "G" and project the output light to the road surface "G". The light projected to the road surface "G" may form the beam pattern "P". The beam pattern "P", as an example, may be a plurality of rectangular patterns P1, P2, and P3 that are spaced apart from each other along the specific direction. For example, a plurality of lamps 10 may be provided, and may be disposed on opposite sides of a rear side of the frame. The plurality of rectangular patterns P1, P2, and P3 formed by, among the plurality of lamps 10, the lamp 10 disposed on a relatively left side may be spaced apart from each other along a direction that faces a rear left side. Furthermore, the plurality of rectangular patterns P1, P2, and P3 formed by, among the plurality of lamps 10, the lamp 10 disposed on a relatively right side may be spaced apart from each other along a direction that faces a rear right side.

The beam pattern "P" may include the first beam pattern P1, the second beam pattern P2, and the third beam pattern P3. The first beam pattern P1 may be disposed on a rear side of the lamp 10 to be spaced apart from the lamp 10. The first beam pattern P1 may be, among the beam patterns "P", a pattern that is located at the shortest distance from the lamp 10. The first beam pattern P1 may be named as a 'short distance pattern P1'.

The second beam pattern P2 and the third beam pattern P3 may be located on a rear side of the short distance pattern P1. For example, a spacing distance between the second beam pattern P2 and the third beam pattern P3, and the lamp 10 may be greater than a spacing distance between the first beam pattern P1 and the lamp 10. That is, the second beam pattern P2 and the third beam pattern P3 may be located at a longer distance from the lamp 10 than the short distance pattern P1. The second beam pattern P2 and the third beam pattern P3 may be named as 'long distance patterns P2 and P3'.

Furthermore, the third beam pattern P3 may be located on a rear side of the second beam pattern P2. For example, a spacing distance between the third beam pattern P3 and the lamp 10 may be greater than a spacing distance between the second beam pattern P2 and the lamp 10. That is, the third beam pattern P3 may be a pattern in the beam pattern "P" which is located at the longest distance from the lamp 10. However, the shapes of the beam patterns are not limited to the example, and the number of the plurality of rectangular patterns may be four or more. Moreover, the beam pattern "P" may be implemented by various patterns, such as a polygonal shape, a circular shape, an arrow, and a warning notification indication.

The lamp 10, as an example, may be a rear guide lamp that is provided on a rear side of the vehicle 1. However, the spirits of the present disclosure are not limited thereto, and the lamp 10 may be provided on a side surface or a front surface of the vehicle 1 to form various beam patterns on the road surface. The lamp 10 may include a light source 100, a collimator 200, a mask 300a, a lens 400, and an opening 500. The light source 100, the collimator 200, the mask 300a, the lens 400, and the opening 500 may be sequentially arranged along an optical axis "X". The optical axis "X" may be defined as an imaginary straight line that passes through centers of the light source 100, the collimator 200, the mask 300a, the lens 400, and the opening 500.

The light source 100 may output the light. The light source 100, as an example, may be an LED. The light output from the light source 100 may be input to the collimator 200.

The collimator 200 may condense the light. For example, the light output from the light source 100 may be diffused as it goes more distant from the optical axis "X". The diffused light may be converted to light that is parallel to the optical axis "X" when being input to the collimator 200, passing therethrough, and then being output therefrom. That is, the collimator 200 may convert the light output from the light source 100 to parallel light. The light output from the collimator 200 may reach the mask 300a. The collimator 200 may be disposed on a rear side of the light source 100.

Any portion of the light that reaches the mask 300a may be output from the mask 300a after being input thereto and passing therethrough. Furthermore, the mask 300a may shield another portion of the light that reaches the mask 300a. The light output from the mask 300a may be projected to the road surface "G" to form the beam pattern "P" on the road surface "G". The mask 300a may be disposed on a rear side of the collimator 200. The mask 300a may include a short distance area 310 and long distance areas 320 and 330.

A short distance light in the light output from the light source 100 may reach the short distance area 310. Any portion of the short distance light that reaches the short distance area 310 may be shielded. Furthermore, another portion of the short distance light that reaches the short distance area 310 may be output from the short distance area 310 after being input thereto and passing therethrough. The light output from the short distance area 310 may form the short distance pattern P1 on the road surface "G".

Furthermore, the short distance area 310 may have a shape, a width of which becomes smaller as it goes in a first direction. The first direction may be defined as a direction, in which the short distance area 310 faces the long distance areas 320 and 330. For example, when the short distance area 310 is viewed in a direction of the optical axis "X", the short distance area 310 may have a parallelogram shape. Through the shape of the short distance area 310, the short distance pattern P1 may have a rectangular shape. For example, the light that passes through an end of the short distance area 310 in an opposite direction to the first direction may form a first short distance pattern end that is an end of the short distance pattern P1 at the closest location to the lamp 10. Furthermore, the light that passes through an end of the short distance area 310 in the first direction may form a second short distance pattern end that is an end of the short distance pattern P1 at the most distant location from the lamp 10. In a more detailed example, a spacing distance between an end of the short distance area 310 in the second direction and the first short distance pattern end may be smaller than a spacing distance between an end of the short distance area 310 in the first direction and the second short distance pattern end. The short distance area 310 may include a pattern shield area including shield dots 311a and a transmission area 312a.

Figure 4:
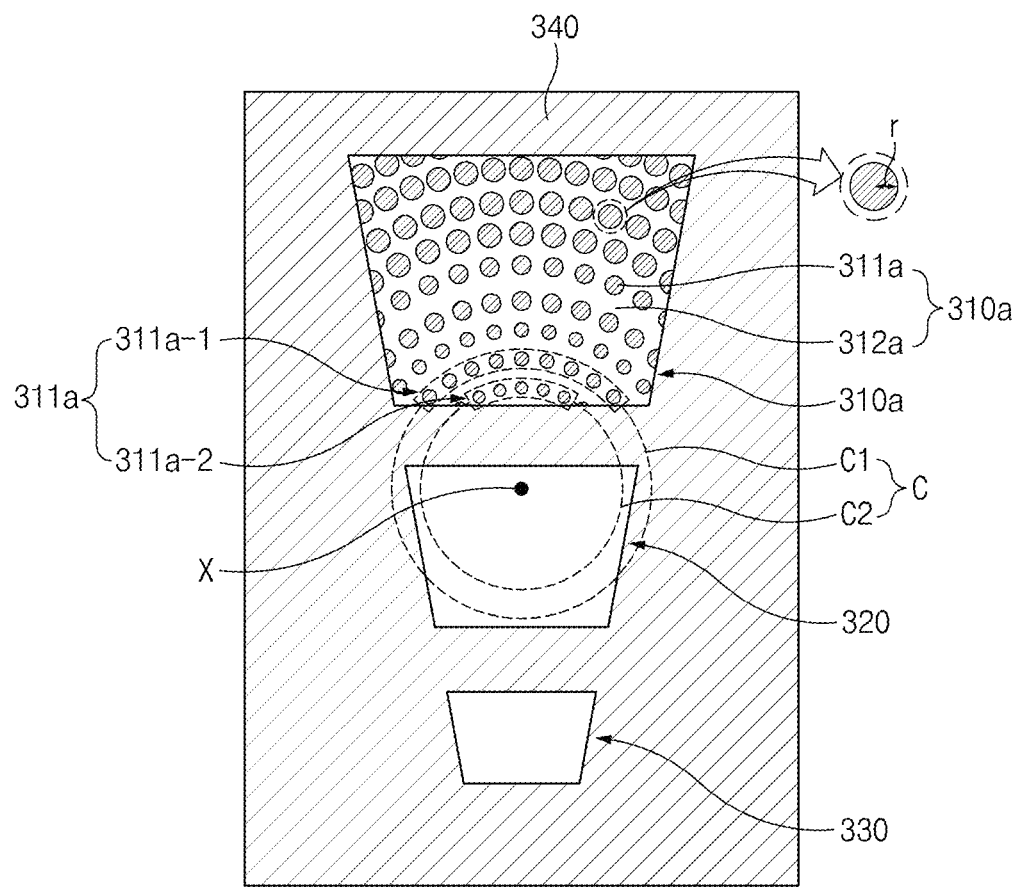
FIG. 4 is a front view of a mask according to an embodiment of the present disclosure.

Referring further to FIG. 4, the pattern shield area may shield any portion of the short distance light that reaches the short distance area 310. A plurality of shield dots 311a may be provided. The plurality of shield dots 311a may be spaced apart from each other. The plurality of shield dots 311a may be spaced apart from each other along a circumferential direction of an imaginary circle "C", a center of which is the optical axis "X". The imaginary circle "C" may include a plurality of imaginary circles C1 and C2 that are concentric to each other. The plurality of imaginary circles C1 and C2 may include the first imaginary circle C1 and the second imaginary circle C2. A radius of the first imaginary circle C1 may be greater than a radius of the second imaginary circle C2. Meanwhile, although not directly illustrated in the drawings, the plurality of circles may be understood as a concept including two or more imaginary circles.

The plurality of shield dots 311a may include a first shield dot group 311a-1 and a second shield dot group 311a-2. The first shield dot group 311a-1 may include a plurality of shield dots 311a. The plurality of shield dots 311a of the first shield dot group 311a-1 may be spaced apart from each other along the first imaginary circle C1. For example, the plurality of shield dots 311a of the first shield dot group 311a-1 may be spaced apart from each other in an area, in which the first imaginary circle C1 and the short distance area 310 overlap each other.

The second shield dot group 311a-2 may include the plurality of shield dots 311a. The plurality of shield dots 311a of the second shield dot group 311a-2 may be spaced apart from each other along the second imaginary circle C2. For example, the plurality of shield dots 311a of the second shield dot group 311a-2 may be spaced apart from each other in an area, in which the second imaginary circle C2 and the short distance area 310 overlap each other. The second shield dot group 311a-2 may be located to be closer to the optical axis "X" than the first shield dot group 311a-1.

Furthermore, a radius of the shield dots 311a included in the first shield dot group 311a-1 may be greater than a radius of the shield dots 311a included in the second shield dot group 311a-2. Moreover, when an imaginary circle, a radius of which is greater than that of the first imaginary circle C1 and a center of which is the optical axis "X" is defined as an arbitrary imaginary circle, a radius "r" of the shield dots 311a arranged in the arbitrary imaginary circle may be greater than a radius "r" of the shield dots 311a included in the first shield dot group 311a-1. That is, the radius "r" of the shield dots 311a located in an area, of which a radial spacing distance between the optical axis "X" and the imaginary circle "C" is relatively large, may be greater than the radius "r" of the shield dots 311a located in an area, in which the radial spacing distance between the optical axis "X" and the imaginary circle "C" is relatively small.

Referring back to FIG. 2, the radius "r" of the shield dots 311a may be determined in Equation 1 below.

$$r = (RP \times 0.5D)/BL \quad \text{[Equation 1]}$$

(D: an effective aperture, BL: a beam pattern length, RP: a resolving power, and r: the radius of the shield dots).

An effective aperture "D" may be defined as a maximum aperture, through which the light output from the lamp 10 may pass. For example, the effective aperture "D" may mean a maximum radius which a light bundle that passes through the opening 500 may have. The effective aperture "D" may be defined by the opening 500.

A resolving power may be defined as a distance between two distinguished points of the beam pattern "P" formed on the road surface "G". As the resolving power becomes higher, the distance between the distinguished two points of the beam pattern "P" may become smaller.

A beam pattern length BL may be defined as a length, by which the beam pattern "P" extends in a direction, in which the short distance pattern P1 and the long distance patterns P2 and P3 are arranged. For example, the beam pattern length BL may be defined as a spacing distance between an end of the short distance pattern P1, which is closest to the lamp 10, and an end of the third beam pattern P3, which is most distant from the lamp 10.

The radius "r" of the plurality of shield dots 311*a* may be smaller than or equal to the radius "r" of the shield dots 311*a* calculated in Equation 1. For example, the radius "r" of the shield dots 311*a* calculated in Equation 1 may be the radius "r" of, among the plurality of shield dots 311*a*, the shield dots 311*a* located in an area that is most distant from the optical axis "X" in a radial direction of the imaginary circle "C". The radius "r" of the shield dots 311*a* calculated in Equation 1 may be smaller than a distance between two adjacent points of the short distance pattern P1 projected to the road surface "G". Through the radius "r" of the shield dots 311*a*, the short distance pattern P1 projected to the road surface "G" may be prevented from being formed in a shape of the transmission area 312*a*. That is, the short distance pattern P1 projected to the road surface "G" may have a blurring effect such that two adjacent points of the short distance pattern P1 are not distinguished. Furthermore, by the shield dots 311*a*, a dissimilar texture between the shape of the short distance pattern P1 and the shapes of the long distance patterns P2 and P3 may be prevented even though an amount of the light output from the short distance area 310*a* is reduced.

Meanwhile, the beam pattern length BL may be calculated in Equation 2 below.

$$BL = (ad \times \tan(Ia))/\cos(a) \quad \text{[Equation 2]}$$

(BL: the beam pattern length, a: an irradiation angle, ad: an irradiation distance, and Ia: an image forming angle)

An irradiation angle "a" may be defined as an angle defined by the optical axis "X" and an imaginary straight line that extends in a direction that is perpendicular to the road surface "G".

The irradiation distance ad may be defined as a spacing distance between a point, at which a chief ray "L" and the road surface "G" cross each other, and the opening 500, in the direction of the optical axis "X". The chief ray "L" may be defined as an imaginary straight line that passes through a center of the opening 500 and extends from the center of the opening 500 in a direction that is askew from the optical axis "X". The chief ray "L" may correspond to a ray in the light bundle that passes through the opening 500, which is located on a side that is closest to the road surface "G". The chief ray "L" together with a marginal ray may determine a size of the beam pattern "P" that is projected to the road surface "G". The marginal ray may be defined as a ray that crosses the optical axis "X" after passing through a periphery of the opening 500. For example, a point, at which the chief ray and the road surface "G" cross each other, may overlap an end of the short distance pattern P1, which is closest to the lamp 10. Furthermore, a point, at which the optical axis "X", the marginal ray, and the road surface "G" overlap each other, may overlap an end of the third beam pattern P3, which is most distant from the lamp 10.

The image forming angle Ia may be defined as an angle defined by the chief ray "L" and the optical axis "X". Furthermore, ad×tan(Ia) in Equation 2 may be defined as an image pattern length IL (IL=ad×tan(Ia)) that is a length of an image pattern IP. The image pattern IP may be defined as a pattern that overlaps a plane that is perpendicular to the optical axis "X" and is spaced apart from the center of the opening 500 by the irradiation distance ad.

The short distance light may be output from the transmission area 312*a* after being input thereto and passing therethrough. The transmission area 312*a* may be disposed to surround the plurality of shield dots 311*a*. For example, the transmission area 312*a* may define an area between, among the plurality of shield dots 311*a*, two adjacent shield dots 311*a*.

The long distance light in the light output from the light source 100 may reach the long distance areas 320 and 330. At least a portion of the long distance light may be input to the long distance areas 320 and 330. For example, the entire long distance light may be input to the long distance areas 320 and 330 while not being shielded by the long distance areas 320 and 330. That is, the long distance light may be output from the long distance areas 320 and 330 after being input thereto and passing therethrough. The light output from the long distance areas 320 and 330 may form the long distance patterns P2 and P3 on the road surface "G". The long distance areas 320 and 330 may include the first long distance area 320 and the second long distance area 330.

The first long distance light in the long distance light may be output from the first long distance area 320 after being input thereto and passing therethrough. The light output from the first long distance area 320 may form the second beam pattern P2. The first long distance area 320 may be disposed to be spaced apart from the short distance area 310 in the first direction. For example, the first long distance area 320 may be disposed in the first direction of the short distance area 310.

Furthermore, the first long distance area 320 may have a shape, a width of which becomes smaller as it goes in the first direction. For example, the first long distance area 320 and the short distance area 310 may have similar shapes having different sizes. That is, when the first long distance area 320 is viewed in the direction of the optical axis "X", the first long distance area 320 may have a parallelogram shape. In a more detailed example, a width of an end of the first long distance area 320 in the second direction may be smaller than a width of an end of the short distance area 310 in the first direction.

The second long distance light may be output from the second long distance area 330 after being input thereto and passing therethrough. The light output from the second long distance area 330 may form the third beam pattern P3. The second long distance area 330 may be disposed to be spaced apart from the first long distance area 320 in the first direction. For example, the second long distance area 330 may be disposed in the first direction of the first long distance area 320.

Furthermore, the second long distance area 330 may have a shape, a width of which becomes smaller as it goes in the first direction. For example, the second long distance area 330 and the first long distance area 320 may have similar shapes having different sizes. That is, when the second long distance area 330 is viewed in the direction of the optical axis "X", the second long distance area 330 may have a parallelogram shape. In a more detailed example, a width of an end of the second long distance area 330 in the second direction may be smaller than a width of an end of the first long distance area 320 in the first direction.

A peripheral area 340 may shield peripheral light in the light output from the light source 100. The peripheral light, the short distance light, and the long distance light may be different lights. The peripheral area 340 may have a shape that surrounds the short distance area 310, the first long distance area 320, and the second long distance area 330.

Furthermore, the mask 300a may include a glass and a shield part. The glass may be configured to transmit the light output from the light source 100. That is, the glass may be formed of a material that transmits the light.

The shield part may be configured to shield the light output from the light source 100. The shield part may be coated on at least a portion of a surface of the glass, which faces the light source 100. The shield part, as an example, may include a chrome (Cr) material.

The short distance area 310 may have a shape, in which the plurality of shield dots 311a corresponding to the shield part are coated on a surface of the glass corresponding to the shape of the short distance area 310. The long distance areas 320 and 330 may include glass, and may not include any shield part. For example, the long distance areas 320 and 330 may be formed of the glasses corresponding to the shapes of the long distance areas 320 and 330. However, the present disclosure is not limited thereto. Furthermore, the peripheral area 340 may have a shape, in which the shield part is coated on a surface of the glass corresponding to the peripheral area 340.

The light output from the mask 300a may be output from the lens 400 after being input thereto and passing therethrough. The lens 400 may be disposed on a rear side of the mask 300a. The lens 400 may include a first lens 410 and a second lens 420. The light output from the mask 300a may be output from the first lens 410 toward the second lens 420 after being input thereto and passing therethrough. The first lens 410 may be disposed between the mask 300a and the second lens 420 along the direction of the optical axis "X".

The light output from the first lens 410 may be output from the second lens 420 toward the opening 500 after being input thereto and passing therethrough. Furthermore, the first lens 410 and the second lens 420, as an example, may be separate members. However, the present disclosure is not limited thereto, and they may be integrally formed unlike the illustration of FIG. 3.

An opening space that is a space, through which the light output from the second lens 420 passes, may be formed in the opening 500. A size of the opening space may determine the effective aperture "D". For example, when the opening space is viewed along the direction of the optical axis "X", the opening space may have a circular shape, a center of which is the optical axis "X" and a diameter of which is the effective aperture "D". The opening 500 may be disposed on a rear side of the second lens 420.

The frame may define an external appearance of the vehicle 1. The frame may support the lamp 10. Furthermore, the lamp 10 may be disposed on a rear side of the frame. A plurality of lamps 10 may be provided. Any one of the plurality of lamps 10 may be disposed on a left side of a rear side of the frame, and another one may be disposed on a right side of the rear side of the frame.

Figure 5:
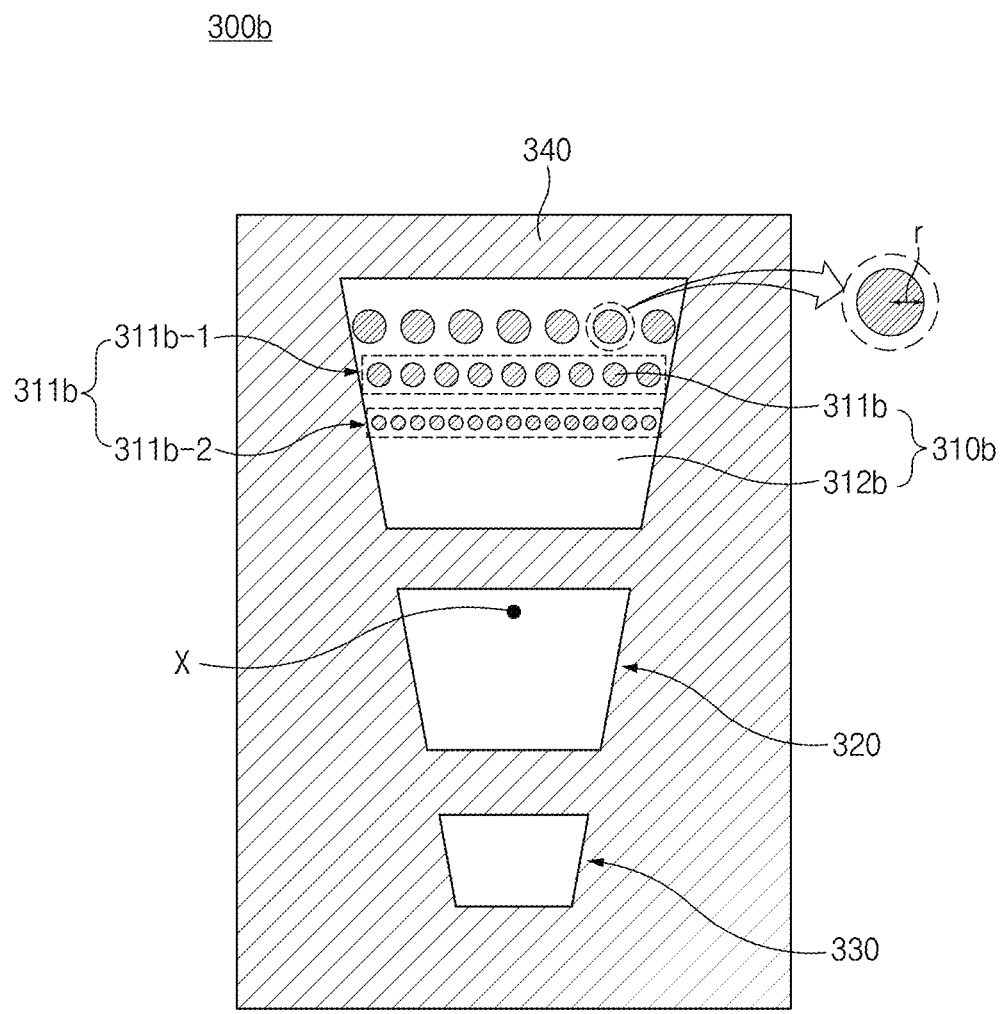
FIG. 5 is a front view of a mask according to another embodiment of the present disclosure.

Hereinafter, referring to FIG. 5 a mask 300b according to another embodiment of the present disclosure will be described. In a description of the another embodiment of the present disclosure, differences from the one embodiment of the present disclosure will be mainly described.

The mask 300b according to the another embodiment of the present disclosure may include a short distance area 310b, the long distance areas 320 and 330, and the peripheral area 340. Meanwhile, a description of the contents regarding the long distance areas 320 and 330 and the peripheral area 340 in the another embodiment of the present disclosure may be replaced by the description of the contents regarding the long distance areas 320 and 330 and the peripheral area 340 in the one embodiment of the present disclosure.

The short distance area 310b may include a pattern shield area including a plurality of shield dots 311b, and a transmission area 312b. The plurality of shield dots 311b may be spaced apart from each other. The plurality of shield dots 311b may include a shield dot groups that are spaced apart from each other along a horizontal direction. The horizontal direction may be defined as a direction that is perpendicular to the first direction and the direction of the optical axis "X". Furthermore, the horizontal direction may correspond to a widthwise direction of the short distance area 310b. A plurality of shield dot groups may be provided.

The plurality of shield dot groups may include a first shield dot group 311b-1 and a second shield dot group 311b-2. The first shield dot group 311b-1 may include the plurality of shield dots 311b. Furthermore, the second shield dot group 311b-2 may include the plurality of shield dots 311b.

The first shield dot group 311b-1 and the second shield dot group 311b-2 may be spaced apart from each other in a vertical direction. The vertical direction may be defined as a direction that is parallel to the first direction and the second direction. For example, the second shield dot group 311b-2 may be located to be closer to the optical axis "X" than the first shield dot group 311b-1. That is, the second shield dot group 311b-2 may be disposed in the first direction of the first shield dot group 311b-1.

Furthermore, a radius "r" of the plurality of shield dots 311b included in the first shield dot group 311b-1 may be greater than a radius "r" of the plurality of shield dots 311b included in the second shield dot group 311b-2. Moreover, when the shield dot group disposed in the first direction of the second shield dot group 311b-2 is defined as an arbitrary shield dot group, a radius "r" of the plurality of shield dots 311b included in the arbitrary shield dot group may be smaller than the radius "r" of the plurality of shield dots 311b included in the second shield dot group 311b-2. That is, a radius "r" of the shield dots 311b located in an area, of which a vertical spacing distance from the optical axis "X" is relatively large, may be greater than a radius "r" of the shield dots 311b located in an area, of which a vertical spacing distance from the optical axis "X" is relatively small.

The radius "r" of the shield dots 311b may be calculated in Equation 1 expressed in the one embodiment of the present disclosure. Furthermore, the radius "r" of the shield dots 311b calculated in Equation 1 may be a radius "r" of, among the plurality of shield dots 311b, the shield dots 311b located at the most distant area from the optical axis "X" in the vertical direction.

Figure 6:
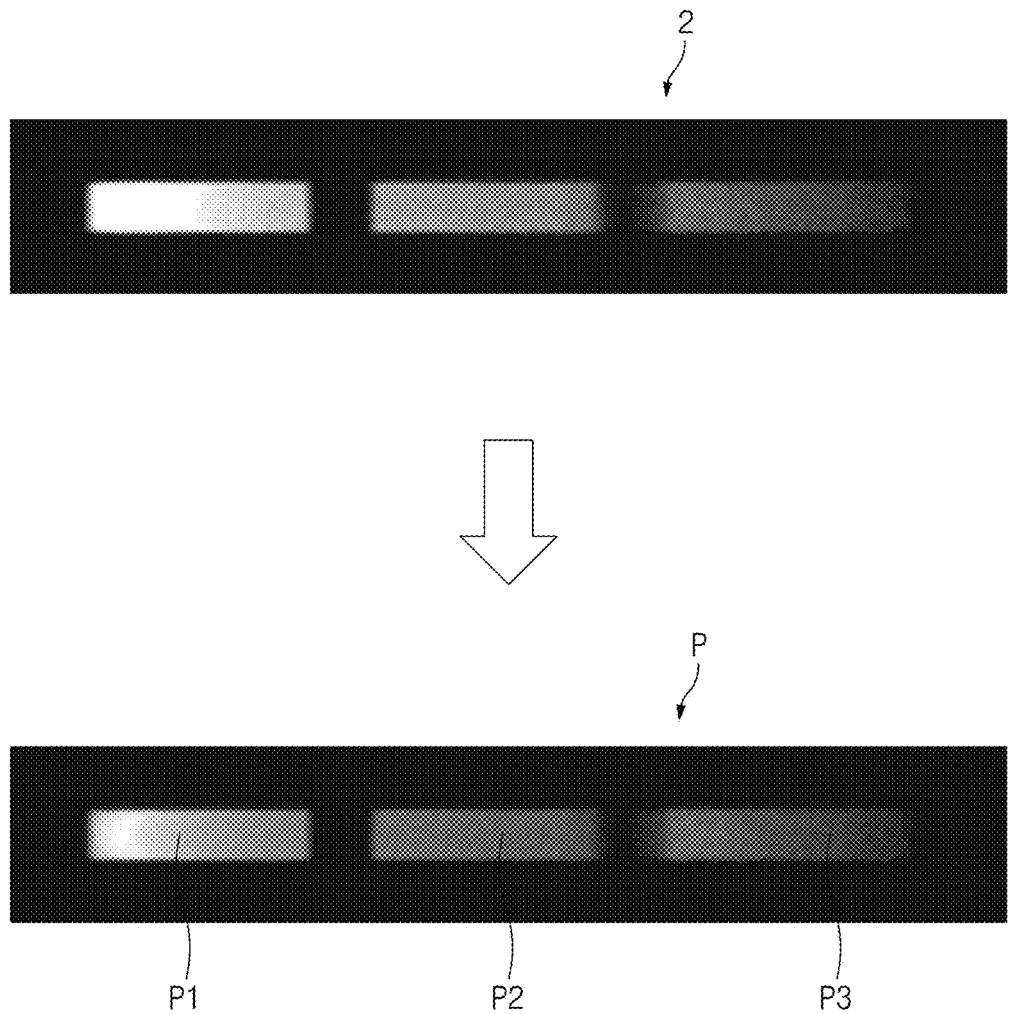
FIG. 6 is a view illustrating a conventional beam pattern, and a beam pattern according to the present disclosure.

Referring to FIG. 6, a conventional beam pattern 2 may be a beam pattern that is formed on a road surface by light that is output from a mask having no shield dot 311a and 311b. When compared with a short distance pattern and two long distance patterns of the conventional beam pattern 2, a uniformity of the short distance pattern P1, the second beam pattern P2, and the third beam pattern P3 of the beam pattern "P" of the present disclosure is higher than that of the short distance pattern and the two long distance patterns of the conventional beam pattern 2. Because the uniformity of the short distance pattern P1, the second beam pattern P2, and the third beam pattern P3 becomes higher, a visual recognition of the pattern to a person who views the beam pattern "P" is increased.

The lamp according to the present disclosure may enhance the uniformity of the entire beam pattern by minimizing a difference between illumination intensities of the short distance pattern and the long distance patterns.

In addition, the lamp according to the present disclosure may enhance a visual recognition for the beam pattern by drivers of surrounding vehicles and pedestrians by enhancing the uniformity of the entire beam pattern.

Even when it has been described above that all the components that constitute the embodiments of the present disclosure are combined into one or are combined to be operated, the present disclosure is not limited to the embodiments. That is, all the components may be selectively combined into one to be operated with a range of the purpose of the present disclosure. Further, because the above-described terms, such as "comprising", "including", or "having" mean that the corresponding components may be included unless particularly described in an opposite way, it should be construed that another component is not excluded but may be further included. Unless defined differently, all the terms including technical or scientific terms have the same meanings as those generally understood by an ordinary person in the art, to which the present disclosure pertains. The generally used terms such as the terms defined in advance should be construed to coincide with the context meanings of the related technologies, and should not be construed as ideal or excessively formal meanings unless defined explicitly in the present disclosure.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. A lamp comprising:
a light source configured to output light; and
a mask configured to receive the light output from the light source and project a beam pattern on a road surface,
wherein the mask includes:
a long distance area configured to form a long distance pattern in the beam pattern projected on the road surface based on long distance light in the light output from the light source that reaches the long distance area; and
a short distance area configured to form a short distance pattern in the beam pattern projected on the road surface based on short distance light in the light output from the light source that reaches the short distance area, the short distance pattern located closer to the mask than the long distance pattern on the road surface,
wherein the short distance area includes a pattern shield area comprising a plurality of circular shield dots.

2. The lamp of claim 1, further comprising:
an opening configured to form an effective aperture that is a maximum aperture, through which lamp light output from the lamp passes,
wherein a beam pattern length is a length by which the beam pattern extends in an arrangement direction, in which the short distance pattern and the long distance pattern are arranged, and
a radius of the circular shield dots satisfies $r=(RP \times 0.5D)/BL$ (D: the effective aperture, BL: the beam pattern length, RP: a resolving power, and r: the radius of the circular shield dots).

3. The lamp of claim 2, wherein:
an optical axis is a first imaginary straight line extending in a direction in which the light source faces a center of the opening,
an irradiation angle is an angle between the optical axis and a second imaginary straight line extending in a direction perpendicular to the road surface,
an irradiation distance is a spacing distance in a direction of the optical axis between (1) the opening and (2) a point, at which a chief ray that is a third imaginary straight line extending from the center of the opening in a direction that is askew from the optical axis and the road surface cross each other,
an image forming angle is an angle between the chief ray and the optical axis, and
the beam pattern length satisfies $BL=(ad \times \tan(Ia))/\cos(a)$ (BL: the beam pattern length, a: the irradiation angle, ad: the irradiation distance, and Ia: the image forming angle).

4. The lamp of claim 1, wherein the plurality of circular shield dots are spaced apart from each other.

5. The lamp of claim 4, wherein:
the plurality of circular shield dots include a plurality of circular shield dot groups spaced apart from each other along a horizontal direction, and
the plurality of circular shield dot groups include:
a first circular shield dot group; and
a second circular shield dot group spaced apart from the first circular shield dot group in a vertical direction and located closer to an optical axis extending in a direction in which the light is output from the light source, than the first circular shield dot group,
wherein radii of the plurality of circular shield dots included in the first circular shield dot group are greater than those of the plurality of circular shield dots included in the second circular shield dot group.

6. The lamp of claim 4, wherein:
the short distance area further includes a transmission area through which the short distance light passes, and the transmission area defines an area between, among the plurality of circular shield dots, two adjacent circular shield dots.

7. The lamp of claim 1, wherein the short distance area has a horizontal width that becomes smaller in a first direction facing the long distance area from the short distance area.

8. The lamp of claim 7, wherein the long distance area is disposed in the first direction of the short distance area and spaced apart from the short distance area.

9. The lamp of claim 8, wherein a horizontal width of the short distance area in the first direction is greater than that of the long distance area in a second direction opposite to the first direction.

10. The lamp of claim 9, wherein the long distance area has a horizontal width that becomes smaller in the first direction.

11. The lamp of claim 9, wherein:
the long distance area includes:
a first long distance area; and
a second long distance area disposed in the first direction of the first long distance area and spaced apart from the first long distance area, and
a horizontal width of the first long distance area in the first direction is greater than that of the second long distance area in the second direction.

12. The lamp of claim 1, wherein:
the mask further includes a peripheral area configured to shield a different portion of the light that reaches the mask, and
the peripheral area surrounds the short distance area and the long distance area.

13. The lamp of claim 1, wherein the mask includes:
a glass configured to transmit the light output from the light source; and
a shield part configured to shield the light output from the light source, and
wherein the shield part is coated on at least a portion of a surface of the glass that faces the light source.

14. The lamp of claim 13, wherein the shield part includes chrome.

15. A lamp comprising:
a light source configured to output light; and
a mask configured to receive the light output from the light source and project a beam pattern on a road surface,
wherein the mask includes:
a long distance area configured to form a long distance pattern in the beam pattern projected on the road surface based on long distance light in the light output from the light source that reaches the long distance area; and
a short distance area configured to form a short distance pattern in the beam pattern projected on the road surface based on short distance light in the light output from the light source that reaches the short distance area, the short distance pattern located closer to the mask than the long distance pattern on the road surface,
wherein the short distance area includes a pattern shield area comprising a plurality of shield dots spaced apart from each other in circumferential directions of a plurality of imaginary circles, centers of which are an optical axis extending in a direction in which the light source faces the mask.

16. The lamp of claim 15, wherein:
the plurality of imaginary circles include:
a first imaginary circle; and
a second imaginary circle having a radius smaller than that of the first imaginary circle and being concentric to the first imaginary circle, and
radii of a first group of the shield dots spaced apart from each other along the first imaginary circle are greater than those of a second group of the shield dots spaced apart from each other along the second imaginary circle.

* * * * *